UNITED STATES PATENT OFFICE.

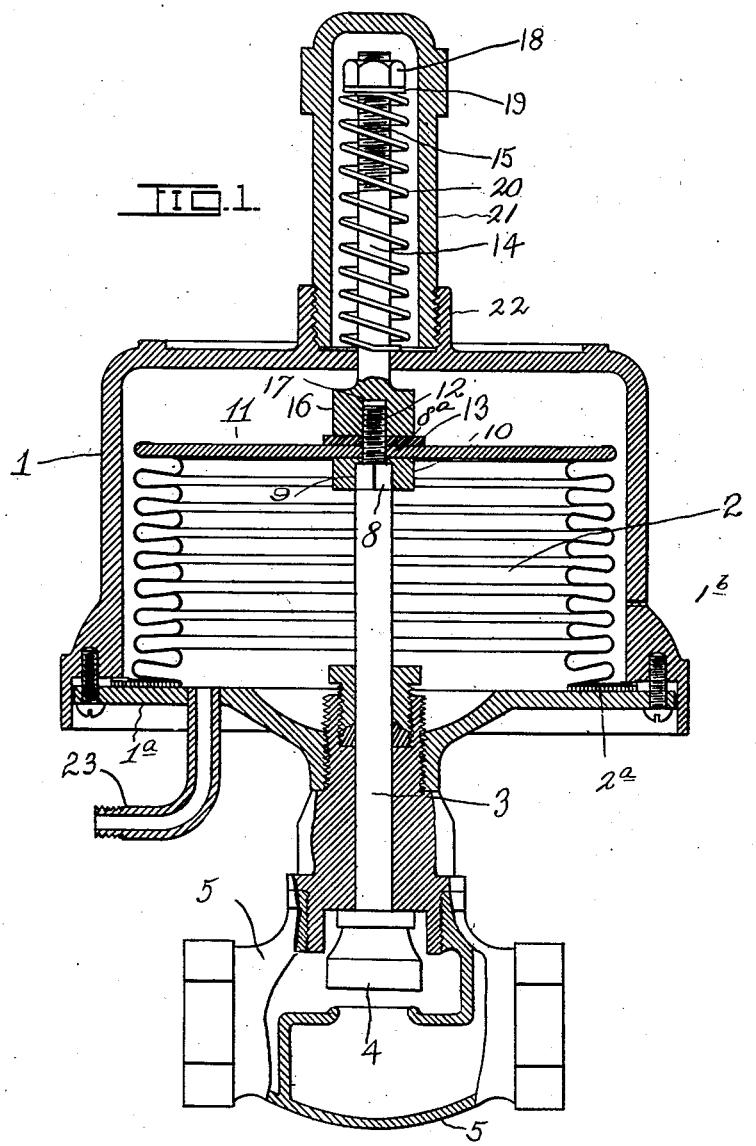

JOSEPH H. BRADY, OF KANSAS CITY, MISSOURI.

VACUUM-AIR-LINE GOVERNOR.

1,171,695.   Specification of Letters Patent.   Patented Feb. 15, 1916.

Application filed June 30, 1915. Serial No. 37,192.

*To all whom it may concern:*

Be it known that I, JOSEPH H. BRADY, a citizen of the United States, residing at Kansas City, in the county of Jackson and State of Missouri, have invented certain new and useful Improvements in Vacuum-Air-Line Governors, of which the following is a specification.

My invention relates to improvements in vacuum air line governors, which consist of a puppet valve whose position is governed by the more or less contracted condition of a vacuum chamber formed by a resilient bellows.

The governor to which the present improvement is applied is one of the type disclosed by my pending application, Serial Number 14,487, for improvements in steam heating systems.

The present invention relates to means for effecting accurate manual adjustment of spring-tension upon the vacuum bellows and more particularly to an improved mounting for said means.

In order that the invention may be fully understood, reference will now be made to the accompanying drawing, in which:

Figure 1 shows a central vertical section of a governor provided with my improved adjusting device. Fig. 2 is a top end view of the spring rod detached. Fig. 3 is a section of the lower end of said rod. Fig. 4 shows a section of a valve-stem boss. Fig. 5 is a bottom plan view of said boss. Fig. 6 is a detail view of the upper end of the valve-stem. Fig. 7 is a top end view of said stem.

1 designates the cast metal bonnet which incloses the resilient bellows 2, secured upon a rubber gasket 2ª interposed between the lower edge of the bonnet 1 and its bottom plate 1ª. The chamber formed by the bonnet 1 and the bottom plate 2ª communicates with atmosphere through a port 1ᵇ.

3 designates the valve stem, 4 the valve, and 5 the valve body to which the line pipes are connected.

The upper end of the valve stem 3 is squared as at 8, and fits in a square countersunk socket 9 in a boss 10 which is secured to a disk 11 forming the head of the bellows 2. Above its square portion 8, the valve stem is provided with a reduced threaded end 12 forming a shoulder 8ª, the end 12 passing through a hole in disk 11 and through a rubber gasket 13 on said disk.

In the governor shown in Fig. 2 of my other application above referred to, no means were shown whereby the responsiveness of the bellows might be varied, to compensate for varying degrees of exhaustion in the vacuum pipe (14) having connection with the bellows. It is obvious that the normal position of the valve 4 will be lower when the normal vacuum is higher, and higher when the normal vacuum is lower. This precludes a true normal position for the valve 4, unless a compensating adjustment be provided, and this is what I have done as will now be described.

A spring rod 14 is provided with a threaded upper end 15 and with an enlarged lower end 16, in which is a central threaded bore 17 (Fig. 3) to receive the tip 12 of the valve stem, and by screwing the rod 14 down tight upon the gasket 13 it is firmly secured to the bellows head 11.

A circular hole is drilled through the top of bonnet 1, the spring rod 14 passing slidably therethrough. On the threaded part 15 is a thumb-nut 18 and a washer 19. A helical expansion spring 20 is confined between the washer 19 and the bonnet 1, whereby said spring presses upwardly upon the rod 14, thus tending to expand the bellows 2, or opposing the atmospheric pressure thereon.

To protect the parts just described, I provide a tubular cap 21 having a threaded lower portion as shown. The top of the bonnet 1 is cast with a threaded flange 22, which receives and fastens said tubular cap.

When the normal vacuum in the pipe connected to nipple 23 falls, the valve 4 will rise; this may be offset by screwing down the nut 18 until the valve stands at the desired or normal position. On the other hand, when the normal vacuum rises, the valve will stand lower and this may be corrected by turning the nut 18 in reverse direction.

Having thus described my invention, what I claim and desire to secure by Letters Patent, is:

In a pressure regulated valve, a valve body having a threaded opening in the upper side thereof, a supporting element having a central bore, terminating in a relatively large recessed portion at one end thereof, said supporting element having its ends screw threaded, the threaded recessed end engaging within the threaded opening of the valve body, a circular plate having a depending flange threaded to engage the other threaded end of the supporting element, said circular plate also having an opening to receive one end of a nipple, a bonnet having an enlarged lower end to provide a seat for the circular plate, a bellows in the bonnet, a gasket secured to the lower end of the bellows, said gasket being interposed between the seat of the bonnet and circular plate, for holding the bellows in position, a disk forming the upper end of the bellows, said disk having a central opening, a valve stem extending through the bore of the supporting element and having an outer threaded end extending through said central opening in said disk, a valve on the inner end of the valve stem, said valve being adapted to move in the recessed portion of the supporting element, and a spring pressed rod having an enlarged head provided with a threaded opening to receive the threaded end of the valve stem, said valve stem and the rod clamping the disk therebetween.

In testimony whereof I affix my signature, in the presence of two witnesses.

JOSEPH H. BRADY.

Witnesses:
FRED C. FISCHER,
L. J. FISCHER.